United States Patent
Cannon et al.

(10) Patent No.: US 6,549,792 B1
(45) Date of Patent: Apr. 15, 2003

(54) ACCELEROMETER INFLUENCED COMMUNICATION DEVICE

(75) Inventors: Joseph M. Cannon, Harleysville, PA (US); James A. Johanson, Macungie, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/339,893

(22) Filed: Jun. 25, 1999

(51) Int. Cl.⁷ .................................................. H04B 1/38
(52) U.S. Cl. ...................... 455/575; 455/343; 455/90; 340/7.32
(58) Field of Search .............................. 455/343, 38.3, 455/89, 575, 90; 379/61, 424, 58, 63; 340/7.32

(56) References Cited

U.S. PATENT DOCUMENTS

| | | | | |
|---|---|---|---|---|
| 4,401,847 A | * | 8/1983 | Schneider et al. ............. | 179/1 |
| 4,504,701 A | * | 3/1985 | Lucchesi ...................... | 179/84 |
| 4,942,605 A | * | 7/1990 | McClain ...................... | 379/424 |
| 5,680,441 A | * | 10/1997 | Gallo .......................... | 379/61 |
| 5,745,559 A | * | 4/1998 | Weir ............................ | 379/199 |
| 5,809,123 A | * | 9/1998 | Reynolds .................... | 379/145 |
| 6,002,937 A | * | 12/1999 | Young et al. ................ | 455/462 |

FOREIGN PATENT DOCUMENTS

JP 0833537 A2 * 4/1998

* cited by examiner

Primary Examiner—Daniel Hunter
Assistant Examiner—Lana Le
(74) Attorney, Agent, or Firm—William H. Bollman

(57) ABSTRACT

In one embodiment, a communication device according to the invention includes an accelerometer, and an operational aspect of the communication device is adapted to be influenced by an output of the accelerometer. The communication device may be a telephone, such as a wireless telephone, and the accelerometer may influence the operational aspect of the wireless telephone to advantageously make the wireless telephone operate more like a wired telephone. An exemplary wireless handset according to the invention may include a wireless transceiver, a controller, and an accelerometer, wherein the controller is adapted to receive an output from the accelerometer and affect a state of the wireless transceiver based thereon. In another embodiment according to the invention, a method of operating a communication device includes the steps of determining a motion characteristic of the communication device, and affecting an operational aspect of the communication device based on the motion characteristic. An exemplary method of operating a wireless telephone handset according to the invention includes the steps of receiving a ring signal, sensing a movement of the handset, and transitioning to an off-hook state from an on-hook state based on the sensed movement. An alternative method of operating a wireless telephone handset includes the steps of determining an absence of voice activity, determining an absence of motion, and transitioning to an on-hook state based on the absence of voice activity and absence of motion.

21 Claims, 2 Drawing Sheets

ACCELEROMETER INFLUENCED COMMUNICATION DEVICE

FIELD OF THE INVENTION

The invention is directed to the field of communication, such as telephony, and in particular to telephone apparatus such as for use in wireless telephony, including, for example, cordless telephones and cellular telephones.

BACKGROUND OF THE INVENTION

Wireless telephones, such as cordless telephones and cellular telephones, have become ubiquitous because they provide users with the opportunity to make and receive telephone calls while mobile. In exchange for this mobility advantage, most users have learned to accept some differences between wireless telephone service and conventional wired telephone service.

For example, users are aware that wireless handsets are battery powered, and understand that a battery must be sufficiently charged for a wireless handset to operate effectively. Users also understand that the battery may eventually need to be replaced after a large number of recharges. This may be contrasted with wired plain old telephone service (POTS), that is perceived by users to be extremely reliable. Engineers designing wireless telephones are thus motivated to develop designs that extend the battery life of wireless telephones so that they are perceived by the user as being more reliable.

One conventional way to extend battery life is to include a standby mode in a cordless telephone. When in this mode, the handset of the cordless telephone turns off its RF transceiver elements, thereby saving power. The transceiver elements may be periodically turned on for brief intervals, and then returned to the off state. When a handset is not cradled with its corresponding base unit, a transition from the standby state to a fully operational state is initiated by user activation of an input unit, such as by activation of a "PHONE" button. After the "PHONE" button is activated, there is typically a one to two second delay until a link with the base unit is established and dial tone is present. This delay may be perceived by the user as an inconvenience or as an indication of poor quality as it differs from the immediate dial tone users are used to receiving with wired telephones.

This is one example of a difference between wireless and wired telephones. There are other differences in the way wireless telephones operate when compared to wired telephones. Although these differences may appear to be insignificant, especially to a user fully aware of the relative merits between wired and wireless telephones, they may cause confusion or inconvenience to less knowledgeable or less technically savvy users. For example, a user of a wired telephone is used to picking up a ringing telephone and immediately being connected with an incoming caller. If the same user answers a ringing cordless telephone that is not cradled in its corresponding base unit, however, the user will not be immediately connected, but must first activate a user input unit, such as the "PHONE" button, to effectively answer the incoming call. If the user is not aware of this difference and the telephone continues to ring, the user may become confused, and may erroneously believe that the telephone is broken. It would therefore be advantageous to have an improved wireless telephone that appears to operate more like a wired telephone.

SUMMARY OF THE INVENTION

In one embodiment, a communication device according to the invention includes an accelerometer, and an operational aspect of the communication device is adapted to be influenced by an output of the accelerometer. The communication device may be a to telephone, such as a wireless telephone, and the accelerometer may influence the operational aspect of the wireless telephone to advantageously make the wireless telephone operate more like a wired telephone. An exemplary wireless handset according to the invention may include a wireless transceiver, a controller, and an accelerometer, wherein the controller is adapted to receive an output from the accelerometer and affect a state of the wireless transceiver based thereon.

In another embodiment according to the invention, a method of operating a communication device includes the steps of determining a motion characteristic of the communication device, and affecting an operational aspect of the communication device based on the motion characteristic. An exemplary method of operating a wireless telephone handset according to the invention includes the steps of receiving a ring signal, sensing a movement of the handset, and transitioning to an off-hook state from an on-hook state based on the sensed movement. An alternative method of operating a wireless telephone handset includes the steps of determining an absence of voice activity, determining an absence of motion, and transitioning to an on-hook state based on the absence of voice activity and absence of motion.

BRIEF DESCRIPTION OF THE DRAWING

Objects and advantages of the invention will be apparent to one of skill in the art upon review of the following detailed description in view of the drawing, wherein.

DETAILED DESCRIPTION

Figure 1:
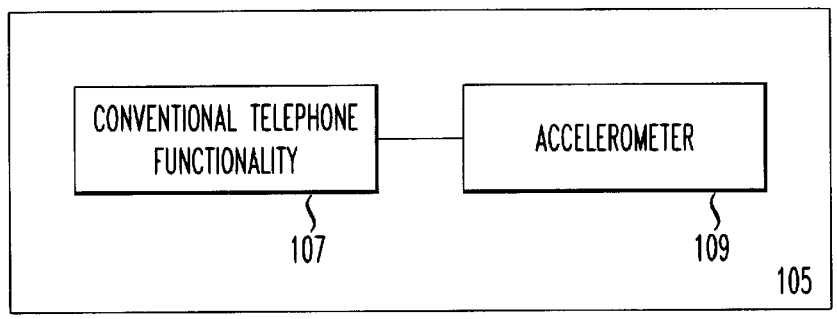
FIG. 1 is a simplified block diagram of an exemplary communication device according to the invention.

FIG. 1 is a simplified block diagram of a first embodiment according to the invention. Here, an exemplary communication device is a telephone 105 that includes conventional telephone functionality 107 and an accelerometer 109. According to the invention, an operational aspect of telephone 105, such as an operational aspect of conventional telephone functionality 107, is adapted to be influenced by an output of accelerometer 109.

For example, the conventional telephone functionality 107 typically includes a controller, such as a microcontroller or digital signal processor (DSP), a keypad or other user input unit, a microphone and a speaker. Further, if telephone 105 is a wired telephone, conventional telephone functionality 107 typically includes a telephone line interface. On the other hand, if telephone 105 is a cellular telephone, then conventional telephone functionality typically includes a wireless transceiver and an antenna. If telephone 105 is a typical cordless telephone comprising a base unit and a handset, then the conventional telephone functionality 107 typically includes both the telephone line interface (in the base unit), and wireless transceiver elements to establish a link between the base unit and the handset.

The conventional telephone functionality 107 may take the form of a functional block or subroutine embodied within the controller. As such, the controller will receive an output from accelerometer 109 and will follow a particular course of action based on this output. For example, the controller may cause the telephone 105 to transition between a standby state and an operational state, or between an on-hook state and an off-hook state, based on the output from accelerometer 109.

The accelerometer 109 may be a micromachined motion sensor, such as an integrated micro-electromechanical system (iMEMS), which combines one or more physical motion sensors with circuitry for conditioning an electrical signal and communicating with the controller. As such, the accelerometer 109 may be realized on an integrated circuit. The integrated circuit of the accelerometer 109 may form part of a chipset with one or more chips collectively making up the controller and other circuitry of telephone 105. Alternatively, all of the functionality of the telephone 105, including the accelerometer 109, may be incorporated into a single integrated circuit chip. An exemplary iMEMS that may perform the functions of accelerometer 109 is the ADXL50 available from Analog Devices, or one of a plurality of surface mount accelerometers available from Silicon Designs.

Figure 2:
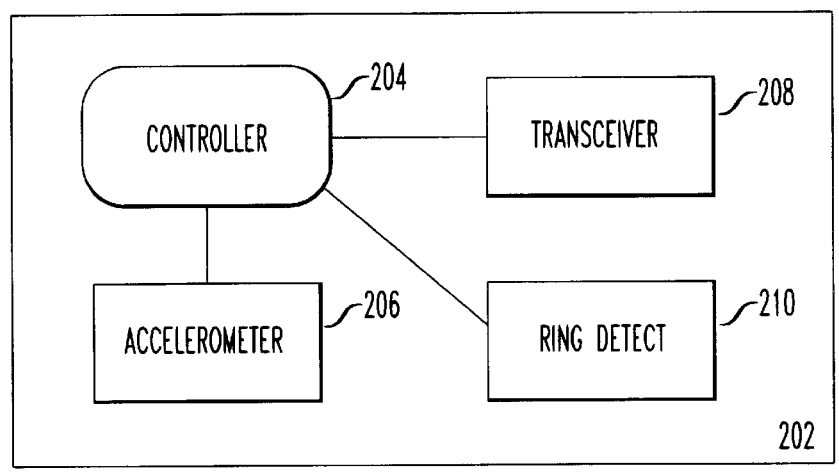
FIG. 2 is a simplified block diagram of an exemplary wireless handset according to the invention.

FIG. 2 is another simplified block diagram showing a particular example of a wireless telephone according to the invention. Here, wireless telephone 202 includes controller 204, accelerometer 206 and transceiver 208. Controller 204 receives an output from accelerometer 206. Controller 204 affects a state of transceiver 208 based on the output of accelerometer 206. For example, based on the output of accelerometer 206, controller 204 may cause transceiver 208 to transition between an on-hook state and an off-hook state, or at least begin such a transition.

For example, in one embodiment wireless telephone 202 is a handset of a cordless telephone. Controller 204 is aware of a present status of handset 202. Presume the present status is that handset 202 is in an on-hook state, meaning that a telephone call is not in progress. Presume the present state is also that handset 202 is not cradled in a corresponding base unit, which controller 204 will know, for example, from a lack of input to any charging mechanism. Presume also that from an output from accelerometer 206, controller 204 is aware that the handset 202 is stationary. Thus, handset 202 is not engaged in a call and is likely sitting on a couch or table, for example, in a family room or kitchen.

Given the fact that handset 202 is not cradled and not engaged in a call, controller 204 will, as is typical for most cordless handsets, put handset 202 into a standby state (also known as a "sleep state") to save power. When in this state, transceiver 208 will essentially be without power, and will "wake up" periodically to determine if it is receiving an incoming signal, such as a ring signal, from a corresponding base unit. Conventionally, if a user wishes to place an outgoing telephone call, the user will press a button, such as a "PHONE" button, on a keypad of handset 202 to establish a link from handset 202 to the corresponding base unit in order to get dial tone. When the "PHONE" button is activated, the typical operation is for the controller 204 to then wake up or transition to an operational state, and to cause the transceiver 208 to establish a link with the corresponding base unit. This process typically takes one to two seconds, and then dial tone is present to be heard by the user.

According to the invention, however, controller 204 is also alerted to a change in position of handset 202 by receiving the output of accelerometer 206. Typically, the motion information from accelerometer 206 will be received by controller 204 prior to the receipt of an indication that the "PHONE" button has been activated. This will occur, for example, if the user picks up the handset from a table and then presses the "PHONE" button. Based on this motion information, controller 204 may initiate a wake up procedure, and may cause transceiver 208 to begin to establish the link with the base unit.

In one exemplary embodiment, the link is established and dial tone is present even if the user does not activate the "PHONE" button. This will cause the handset 202 to operationally act more like a corded phone, in that when the handset is picked up the dial tone is present. In an alternative embodiment, the link is essentially established, at least temporarily, but the dial tone is not presented to the user until the user activates the "PHONE" button. This can be achieved, for example, by establishing the link and muting a speaker associated with handset 202. When the "PHONE" button is activated, the speaker is activated and the dial tone is immediately present. Although this alternative embodiment does not result in operations similar to a wired telephone, it does provide an "instant on" capability that eliminates the one to two second delay in presentation of dial tone. Further, an advantage of this alternative is that it does not result in the presentation of dial tone when the handset is moved but the user does not wish to place an outgoing call.

Handset 202 may also include a ring detection unit 210 to detect a ring command issued by a corresponding base unit. In one exemplary embodiment a ring indication is provided to controller 204 by the ring detection unit 210, and the controller 204 also bases the control of handset 202 on this ring indication. For example, presume the initial conditions are similar to those described above: the handset is out of the cradle; the handset is not engaged in a present call; and the handset is not in motion. In addition, presume the ring indication from ring detection unit 210 transitions from an indication corresponding to no ring signal to an indication corresponding to the presence of a ring signal. In one embodiment according to the invention, if the accelerometer 206 subsequently provides an output indicating that the motion characteristics of the handset 202 have changed, such as by transitioning from a stationary position to motion, the controller 204 causes the transceiver to transition to an off-hook state.

Thus, according to this example, if a user picks up an out of cradle ringing handset, the handset will go off-hook and allow the user to communicate with an incoming caller without the user pressing the "PHONE" button. Thus, this exemplary embodiment also provides an advantage of the handset 202, when uncradled, acting like a cradled handset, and thus acting more like a familiar wired telephone. This can be particularly advantageous, for example, if the user does not have two hands free when the handset 202 rings, such as if the user is holding a baby. This embodiment may be similarly advantageous in a cellular environment, such as when one of the user's hands is busy holding a steering wheel of a moving vehicle.

The ring detection unit 210 and its output of the ring indication may also play a role in the previously described embodiment where the user is attempting to place an outgoing call. In this case, the controller will base its decision to begin to establish the link by beginning to transition from the standby state to the operational state, and to optionally mute the speaker until the "PHONE" button is pressed, on the lack of an incoming ring signal. The decision by the controller 204 may thus boil down to whether an incoming ring signal is present. If it is, and the user moves a previously stationary handset 202, then the link can be established immediately and the handset 202 can be put in an off-hook condition to allow the user to answer the call. If, on the other hand, the to incoming ring signal is not present, the movement may be interpreted as the beginning of an attempt to place an outgoing call and the "instant on" state, where dial tone is immediately present when the "PHONE" button is pressed, can be established.

Figure 3:
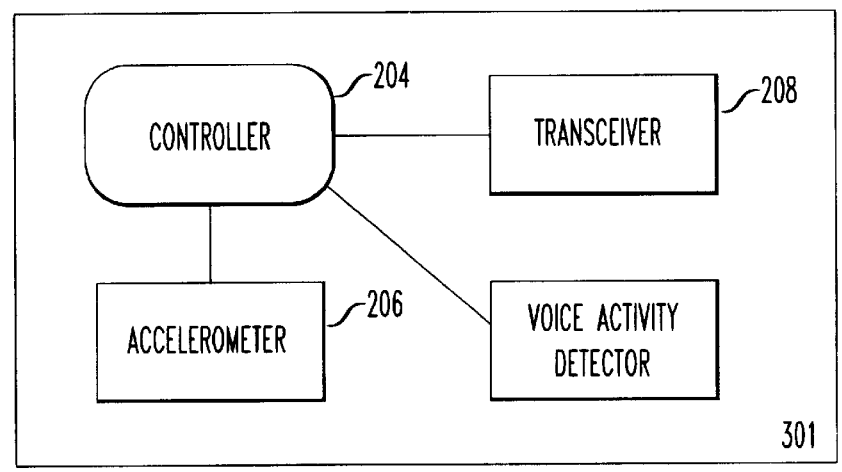
FIG. 3 is a simplified block diagram of another exemplary wireless handset according to the invention.

FIG. 3 is another simplified block diagram showing another particular example of a wireless telephone according to the invention. Here, wireless telephone 301, which may be, for example, a cellular telephone or a cordless handset, includes controller 204, accelerometer 206 and transceiver 208, and also optionally includes a voice activity detector 303. Voice activity detector 303 is coupled to a microphone in wireless telephone 301, and senses the presence or absence of voice activity. It is conventional to use such a detector is some wireless telephones, and to cause the wireless telephone to transition to an on-hook state from an off-hook state if there is no voice activity for a predetermined period of time. In one embodiment according to the invention, controller 204 makes a determination to transition to the on-hook state based on the output of the accelerometer 206, either alone or in combination with the output from voice activity detector 303.

For example, if the voice activity detector 303 detects no voice activity within a predetermined period of time, such that a conventional "auto-off" telephone would automatically transition to the on-hook state, but accelerometer 206 detects motion, or a particular type of motion, the controller 204 may elect to maintain the connection, or to extend the predetermined period of time before going on-hook. Alternatively, if the accelerometer output indicates that there is no motion, the predetermined period of time may be shortened, such that a shorter period of no voice activity causes an on-hook transition.

In the aforementioned embodiments according to the invention, the controller 204 may make a determination simply on the presence of motion, as indicated by the accelerometer. Alternatively, the decision may be based on a change in the motion, such as in amplitude, direction or frequency. For example, a wireless telephone may be in motion while clipped to a user's belt, or while stored in a user's pocket, if the user is walking. A histogram of such motion may show a periodic movement corresponding to a walking gait of the user. If the wireless handset rings, as recognized, for example, by the ring detection unit 210, and the periodic motion continues substantially as before, then although controller 204 senses motion, it may also determine that there is not a change in motion, and may therefore decide not to cause an off-hook transition without activation of the "PHONE" button. If, on the other hand, the motion history changes abruptly in close proximity to the output of a ring, then the controller 204 may elect to transition to an off-hook state without requiring activation of the "PHONE" button.

Figure 4:
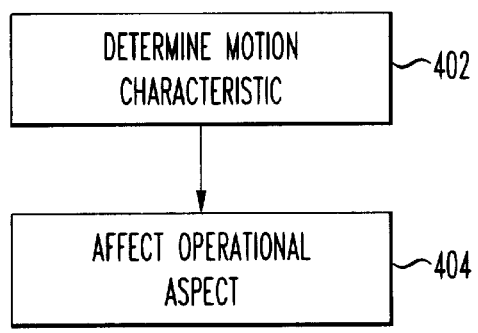
FIG. 4 is a simplified flowchart of operation of an exemplary communication device according to the invention.

FIG. 4 is an exemplary flowchart of operation of a communication device, such as a wireless telephone, according to the invention. In step 402, a motion characteristic is determined, such as by an accelerometer. In step 404, an operational aspect of the communication device is affected based on this motion characteristic, such as by a control action taken by a controller. Exemplary operational aspects are a transition from an off-hook state to an on-hook state, and a transition from an on-hook state to an off-hook state.

Figure 5:
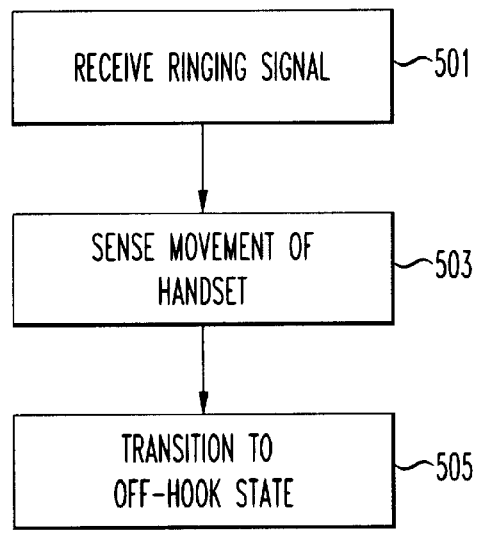
FIG. 5 is a simplified flowchart of operation of an exemplary wireless handset according to the invention.

FIG. 5 is another exemplary operational flowchart, such as in a controller of a wireless telephone handset according to the invention. In step 501, a ringing signal is received. In step 503, motion of the handset is sensed, such as by an accelerometer, and information regarding the sensed motion is provided to the controller. In step 503, the controller causes the wireless telephone handset to transition to an off-hook state. The decision of the controller in step 503 may be based simply on motion, or may be based on a direction of motion, such as in an "up" direction, or in a direction substantially perpendicular to the earth's surface. Alternatively, the decision may be based on a comparison of the sensed motion to a motion history.

Figure 6:
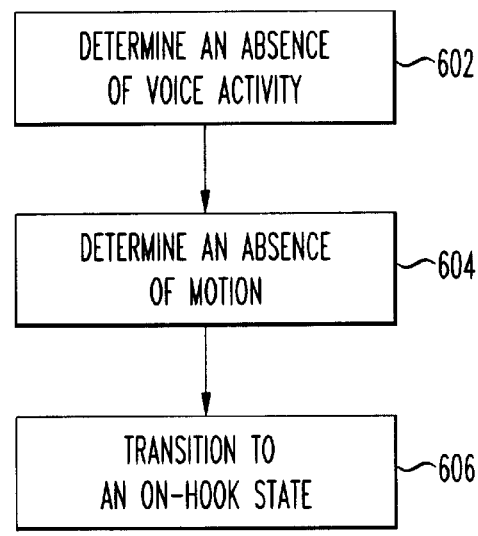
FIG. 6 is simplified flowchart of operation of another exemplary wireless handset according to the invention.

FIG. 6 is another exemplary flowchart of operation of a wireless handset according to the invention. In step 602, an input from a voice activity detector provides information corresponding to a lack of voice activity. In step 604, an accelerometer provides information corresponding to an absence of motion. In step 606, a controller causes the wireless handset to transition to an on-hook state. The determination that there is no voice activity may involve a timing threshold, such that no voice activity is present for a predetermined period of time. Further, the timing threshold may be variable, based, for example, on the motion information or motion history provided by the accelerometer and/or stored in a memory associated with the controller. Also, the ordering of steps 602 and 604 is purely by way of example and not of limitation.

The aforementioned embodiments are described as particular examples specifically relating to wireless handsets, such as cordless telephones and cellular telephones. However, the invention is applicable to any communication device or method of operating the same, and is thus also applicable, for example, to walkie-talkies, satellite-based telephones (such as Iridium® telephones), pagers, or any other form of communication device.

What is claimed is:

1. A cordless telephone, comprising:

a handset with an accelerometer;

a transceiver;

a controller; and a ring detection unit adapted to provide a ring indication to said controller;

wherein there is a transition of said cordless telephone between an on-hook state and an off-hook state based on an output of said accelerometer showing an active movement of said handset.

2. A cordless telephone as recited in claim 1, wherein the transition is from the on-hook state to the off-hook state.

3. A cordless telephone as recited in claim 1, wherein the transition is from the off-hook state to the on-hook state.

4. A wireless handset, comprising:

a wireless transceiver;

a controller;

an accelerometer; and a ring detection unit adapted to provide a ring indication to said controller, wherein said controller is adapted to affect the state of said wireless handset based on an output from said accelerometer and said ring indication.

5. A wireless handset as recited in claim 4, wherein the controller is adapted to cause the wireless transceiver to begin only part of a transition from a standby state to an operational state based on an output from the accelerometer indicating movement and a ring indication corresponding to a lack of an incoming ring signal.

6. A wireless handset as recited in claim 4,
wherein the controller is adapted to cause the wireless transceiver to transition from a standby state to an operational state based on an output from the accelerometer indicating movement and a ring indication corresponding to the presence of an incoming ring signal.

7. A cordless handset, comprising:
a transceiver;
a controller; and
a handset with an accelerometer;
wherein the controller is adapted to cause the transceiver to transition from an on-hook state to an off-hook state based on an output from said accelerometer indicating an active movement of said handset.

8. A cordless handset as recited in claim 7, further comprising:
a voice activity detector,
wherein the controller is further adapted to transition to the standby state based on an indication of no activity from the voice activity detector.

9. A wireless handset, comprising:
a wireless transceiver;
a controller; and
an accelerometer,
wherein the controller is adapted to receive an output from the accelerometer showing an active movement of said wireless telephone and affect a state of said wireless transceiver based on a change in a motion history.

10. A wireless handset as recited in claim 9, wherein the change in motion history is from a period of no movement to a period of movement.

11. A wireless handset as recited in claim 9, wherein the change in motion history is from a period of movement to a period of no movement.

12. A wireless handset as recited in claim 9, wherein the change in motion history is from a period of a first type of movement to a period of a second type of movement.

13. A wireless handset as recited in claim 12, wherein at least one of the first type of movement and the second type of movement is periodic.

14. A method of operating a cordless telephone, comprising the steps of:
determining a motion characteristic of a cordless telephone handset; and
influencing a transition between an on-hook and an off-hook state based on a comparison to a prior history of said motion characteristic.

15. A method of operating a cordless telephone handset, comprising the steps of:
receiving a ring signal;
sensing an active movement of the cordless telephone handset; and
transitioning to an off-hook state from an on-hook state based on a movement history.

16. A method as recited in claim 15, wherein the transition to the off-hook state is based on a sensed movement including a substantial component along an axis perpendicular to the surface of the earth.

17. A method of operating a wireless telephone handset, comprising the steps of:
receiving a ring signal;
sensing an active movement of the wireless telephone handset; and
transitioning to an operational state from a standby state based on a comparison of the sensed movement and a movement history.

18. A method of operating a wireless telephone handset, comprising the steps of:
determining an absence of voice activity;
determining an absence of motion; and
transitioning to a standby state based on the absence of voice activity and absence of motion.

19. A cordless telephone handset, comprising:
means for receiving a ring signal;
means for sensing a movement of the handset; and
means for transitioning to an off-hook state from an on-hook state based on a movement history.

20. A wireless telephone handset, comprising:
means for receiving a ring signal;
means for sensing an active movement of the telephone handset; and
means for transitioning to an off-hook state from an on-hook state based on comparing the sensed movement and a movement history.

21. A wireless telephone handset, comprising:
means for determining an absence of voice activity;
means for determining an absence of motion; and
means for transitioning to an on-hook state based on the absence of voice activity and absence of motion.

* * * * *